United States Patent [19]
Greuel et al.

[11] Patent Number: 5,468,785
[45] Date of Patent: Nov. 21, 1995

[54] COBALOXIME PHOTOINITIATED FREE RADICAL POLYMERIZATIONS

[75] Inventors: Michael P. Greuel, White Bear Twp, Minn.; Labros D. Arvanitopoulos, Akron; H. James Harwood, Stow, both of Ohio

[73] Assignee: University of Akron, Akron, Ohio

[21] Appl. No.: 228,302

[22] Filed: Apr. 15, 1994

[51] Int. Cl.$^6$ .............................. C08F 2/48; C08F 4/44; C08F 18/08; C08F 20/18

[52] U.S. Cl. .................. 522/63; 522/65; 522/66; 522/67; 522/68; 522/26; 522/28; 522/29; 522/904; 522/177; 522/178; 522/182

[58] Field of Search ................... 522/63, 65, 66, 522/904, 55, 67, 68, 26, 28, 29, 177, 178, 182

[56] References Cited

U.S. PATENT DOCUMENTS

| | | | |
|---|---|---|---|
| 4,526,945 | 7/1985 | Carlson et al. | 526/145 |
| 4,680,352 | 7/1987 | Janowicz et al. | 526/147 |
| 4,680,354 | 7/1987 | Lin et al. | 526/172 |
| 4,694,054 | 9/1987 | Janowicz | 526/93 |
| 4,722,984 | 2/1988 | Janowicz | 526/123 |
| 4,746,713 | 5/1988 | Janowicz | 526/170 |
| 4,886,861 | 12/1989 | Janowicz | 526/145 |
| 4,954,414 | 9/1990 | Adair et al. | 522/66 |
| 5,028,677 | 7/1991 | Janowicz | 526/329.7 |

FOREIGN PATENT DOCUMENTS

| | | |
|---|---|---|
| 8703605 | 6/1992 | European Pat. Off. . |
| 8703605 | 6/1987 | United Kingdom . |

OTHER PUBLICATIONS

Schrauzer,titled "Organocobalt Chemistry of Vitamin B12 Model Compounds (Cobaloximes)" Accounts of Chem. Research pp. 97–103, Apr. 1968.

Schrauzer, Sibert & Windgassen,titled "Photochemical & Thermal Cobalt–Carbon Bond Cleavage in Alky . . . " Journal Am. Chem. Soc. pp. 6681–6688, Nov. 1968.

Giannotti, Merle, & Bolton, titled "Electron Spin Resonance Studies of the Anacrobic Photolysis of Alky . . . " Journal of Onganiometallic Chemistry pp. 145–146, 1975.

Enikolopyan Smirnov, Ponomarv & Belgovskii, "Catalyzed Chain Transfer to Monomer in Free Radical Poly . . . " Journal of Polymer Science pp. 879–889, 1981.

Burczyk, O'Driscoll & Rempel,titled "Cobaloxime as a Catalytic Chain Transfer Agent" Journal of Polymer Science pp. 3255–3262, vol. 24, 1984.

*Primary Examiner*—Susan W. Berman
*Attorney, Agent, or Firm*—Oldham & Oldham, Co.

[57] ABSTRACT

The invention relates to the use of cobaloximes and related cobalt(II) complexes which have essentially planar equatorially coordinated ligands and a pair of axially coordinated ligands which have at least one carbon-cobalt bond, as photoinitiators for free radical polymerizations. By selection of the appropriate cobaloximes and related complexes, it is possible to prepare polymers which have useful terminal functionality at both the head and the tail ends of the growing polymer chain. The process also teaches the photochemical polymerization and copolymerizations whereby the alkyl cobaloximes and related compounds, which are used as the photoinitiators, have alkyl groups, which may in essence, be polymers with carbon-cobalt chain ends, thereby allowing grafting reactions to occur to the polymer backbone.

While it is possible to synthesize the cobaloxime and related compounds initially, for subsequent addition to a monomer, it is also taught within this invention that the cobalt complex can be prepared "in-situ", such as by the routes which include: (1) Cobalt-hydride plus monomer addition; (2) free radical initiator plus monomer plus cobalt complex, the ratio of free radical initiator to cobalt complex being essentially 1:1; and (3) the reaction of Co(II) with an alkyl halide.

24 Claims, 6 Drawing Sheets

COBALOXIME PHOTOINITIATED FREE RADICAL POLYMERIZATIONS

TECHNICAL FIELD

The invention described herein pertains generally to the use of cobaloximes and related cobalt(II) complexes which have essentially planar equatorially coordinated ligands and a pair of axially coordinated ligands which have at least one carbon-cobalt bond, as photoinitiators for free radical polymerizations.

BACKGROUND OF THE INVENTION

Cobaloximes, bis-dimethylglyoximato complexes of cobalt, have been used as model compounds in the study of biochemistry of vitamin $B_{12}$. Cobaloximes and cobalamins (vitamin $B_{12}$ and its derivatives), exhibit very similar chemical and photochemical behavior by virtue of the nearly identical coordinating strengths of the macrocyclic dimethylglyoxime and corrin (vitamin $B_{12}$) ligand systems. Five coordinate cobaloximes and cobalamins, where cobalt is in the Co(II) oxidation state, have a high affinity for radicals and react via adduct formation, which involves the generation of a carbon-cobalt bond and β-hydrogen abstraction, which gives an olefin and a cobalt (Ill) hydride, at rates which are essentially diffusion controlled. Alkyl derivatives of cobaloximes and cobalamins can be synthesized and exhibit photochemical behavior which includes the ability to generate radicals reversibly by means of photolytic homolysis of the carbon-cobalt bond.

Steric factors play an important role in the chemistry of cobaloximes and cobalamins, due to the considerable bulk of their macrocyclic ligand systems. The relative magnitudes of these steric factors govern both the stability of the six coordinate cobalt (Ill) alkyl derivatives and the reactivity of the corresponding five coordinate complexes.

One of the earliest applications of organocobalt chemistry to the field of polymer synthesis was in the area of catalytic chain transfer. The concept of catalytic chain transfer, first introduced by Enikolopyan et at., in 1981, involves the transfer of a hydrogen atom from a propagating polymeric radical to a monomer via interaction with an organocobalt catalyst, which is subsequently regenerated. The mechanism of the catalytic chain transfer reaction consists of the abstraction of a β-hydrogen from the propagating radical by the catalyst to give a cobalt hydride and a polymer terminated by a double bond. The cobalt hydride subsequently reinitiates polymerization by transferring the hydrogen atom to a monomer molecule. The transfer reaction, which proceeds at very rapid rates (essentially diffusion controlled), results in polymer molecules terminated exclusively by double bonds. Although initial investigations of catalytic chain transfer involved the use of cobalt porphyrin catalysts, cobaloximes have since been demonstrated to be more efficient catalytic chain transfer agents, while possessing the added advantages of lower cost and better solubility than the porphyrins. Cobaloximes are however, sensitive to oxygen, requiring them to be handled under an inert atomsphere. The prior art has taught however, that the application of catalytic chain transfer is limited mainly to the polymerization of methacrylate esters and styrene.

Since the work of Enikolopyan, Smirnov, Ponomarev, and I. M. Belgovskii, *J. Polymer Sci., Polymer Chem. Ed.*, 19, 879 (1981), had demonstrated that the polymerization of acrylate esters does not result in catalytic chain transfer, but instead results in the formation of stable adducts between the propagating polymeric radical and the cobalt catalyst, it was thought that it would be possible that the alkyl, alkylaryl, arylalkyl and aryl cobaloximes photoinitiated polymerization of these monomers would give polymers with well-defined structures containing a controllable head group and terminated quantitatively by cobaloxime. What was not anticipated was that the termination of the polymer by cobaloxime could be reversible, thus resulting in a chain end that could undergo reversible photolytic homolysis to regenerate the active radical center and subsequently reinitiate polymerization. The net result of the characterization of this reversible termination behavior, was the development of a new living polymerization system, which proceeds via a photoinitiated free radical mechanism.

SUMMARY OF THE INVENTION

In accordance with the present invention, there is provided a process wherein organocobalt compounds, such as alkyl bis(dimethylglyoximato) complexes of cobalt can be used as photoinitiators for free radical polymerizations.

It is an object of this invention to provide a photoinitiated free radical polymerization which shows "pseudo-living" character.

It is another object of this invention to prepare polymers that contain carbon-cobalt linkages at their chain ends which are reasonably thermally stable, yet can be temporarily broken when the polymers are irradiated with light, typically visible light.

It is yet another object of this invention to provide a process whereby polymeric molecular weight can be easily controlled.

It is still yet another object of this invention to provide a system whereby block copolymers can be synthesized by the sequential addition of several monomers to a polymerization system.

It is a further object of this invention to provide a process wherein polymers with useful functional groups can be synthesized at the chain ends of the polymer.

It is a still further object of this invention to provide a process wherein initiators containing several carbon-cobalt bonds can be synthesized and used to prepare telechelic polymers, block copolymers, graft polymers and polymers with star and radial-block architectures.

These and other objects of this invention will be evident when viewed in light of the drawings, detailed description, and appended claims.

DETAILED DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
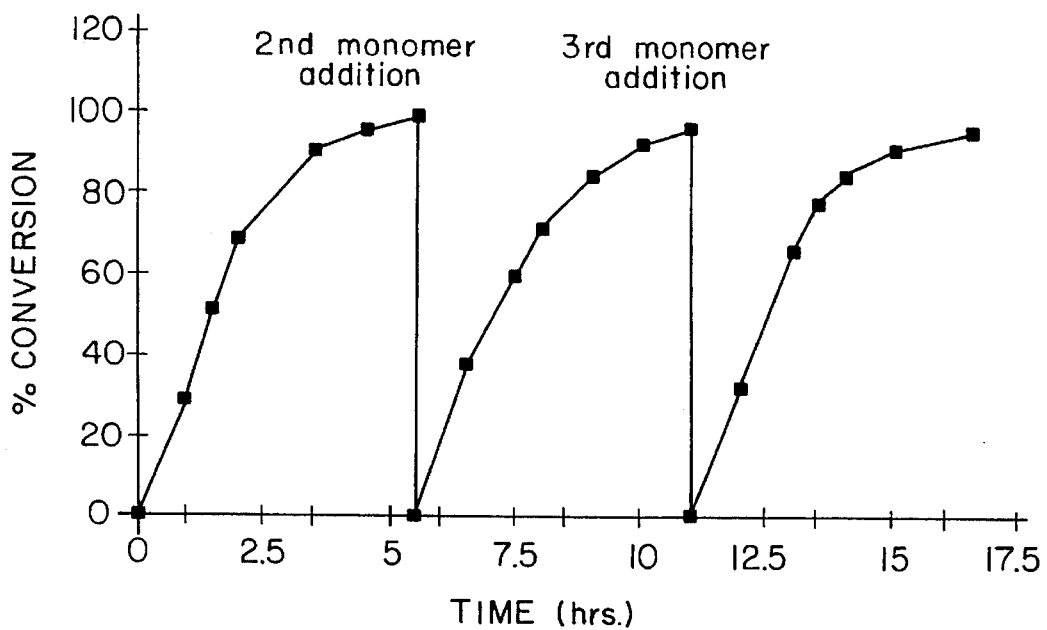
FIG. 1 is a plot of percent conversion vs. time for the free radical polymerization of ethyl acrylate in chloroform solution under light irradiation conditions for a isopropyl cobaloxime initiated polymerization of an 80% solution of ethyl acrylate in $CHCl_3$, wherein $[I]=9.2\times10^{-3}M$.

In typical free radical polymerizations systems, there is poor control of molecular weight and molecular weight distribution. Block copolymers and polymers with useful terminal functionality can only be prepared by special techniques, and then only with difficulty.

It is known to use planar, low spin $Co^{+2}$ macrocyclic complexes, such as cobalt dimethylglyoxime compounds ($Co^{+2}$ DMG), as shown below by formula (I)

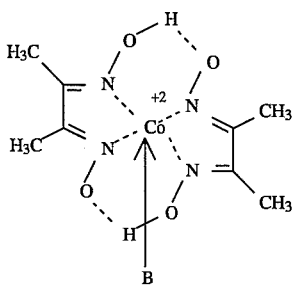

(I)

known hereinafter as cobaloximes, to catalyze free radical chain transfer, thereby regulating molecular weight in free radical polymerizations wherein B is a $C_5H_5N$ ligand. Burczyk, O'Driscoll and G. L. Rempel, *J. Polym. Sci., Polym. Chem. Ed.*, 22, 3255 (1984) have shown the use of such a complex to control the molecular weight of polymers from methyl methacrylate and styrene. The chain transfer process proceeds with the abstraction of a hydrogen atom from polymeric radicals and transfer to a new monomer, thereby initiating a new polymer chain.

The results of previous workers have indicated that catalytic chain transfer was observed almost exclusively in the case of methacrylic monomers (methacrylates and methacrylamides) and styrene, although the catalytic chain transfer constant for styrene was an order of magnitude lower than the value for methyl methacrylate. The polymerizations of acrylate esters, vinyl acetate, and acrylonitrile in the presence of cobalt porphyrin were reported to result in inhibition. In all cases, an induction period, during which the absorption spectrum of the cobalt porphyrin irreversibly changed, was reported. It was also reported that the cobalt porphyrin was bound to the polymer products and could not be extracted by physical means. Similar results were obtained when acrylate monomers were used with cobaloximes. Instead of catalyzing chain transfer, the cobaloximes inhibited the polymerizations.

The present invention builds on the prior art in using a cobaloxime complex as shown by formula (II) wherein P is a growing polymer chain, and B is a coordinating base ligand, such as pyridine or triphenyl phosphine or any other coordinating base ligand which does not destroy the essentially planar conformation of the equatorial ligands, as a photoinitiator which regeneratively participates in the polymerization thereby permitting a higher degree of control over the polymerization than previously possible.

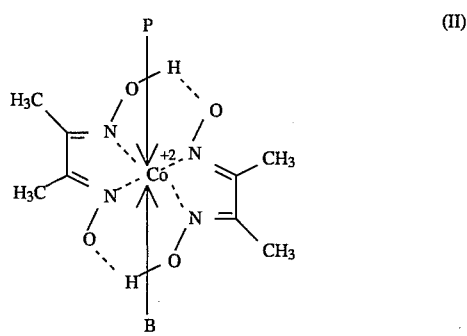

Both spectroscopic and chromatographic characterization of the chain end of a polyacrylate prepared in the presence of a cobaloxime as shown generically by formula (II), have shown the presence of a cobalt-carbon bond which is stable under polymerization conditions. Since compounds bearing carbon-cobalt bonds have been previously shown to be photolabile, reversibly generating free radicals upon irradiation, Schrauzer, Sibert and Windgassen, *J. Am. Chem. Soc.*, 88, 3738 (1966), and Giannotti, Merle and Bolton, *J. Organomet. Chem.*, 99, 145 (1975), the invention lies in the recognition that polyacrylates with terminal carbon-cobalt bonds were capable of participating in "pseudo-living" polymerizations.

While the majority of the polymerizations have been carried out using the cobalt complex shown above as formula (II), there is no need to limit the invention to such. Further non-limiting examples of cobalt complexes which are believed to be useful in this invention would include those identified in U.S. Pat. No. 4,886,861, which is hereinby fully incorporated by reference, and which shows cobalt complexes of the following formulas:

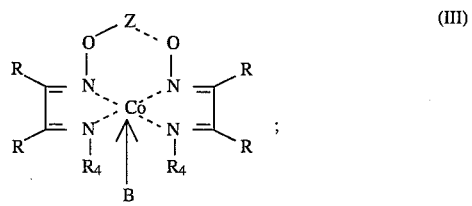

(III)

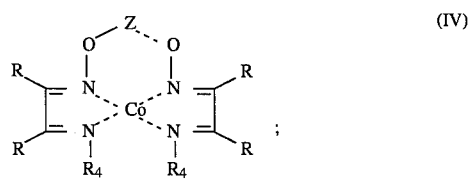

(IV)

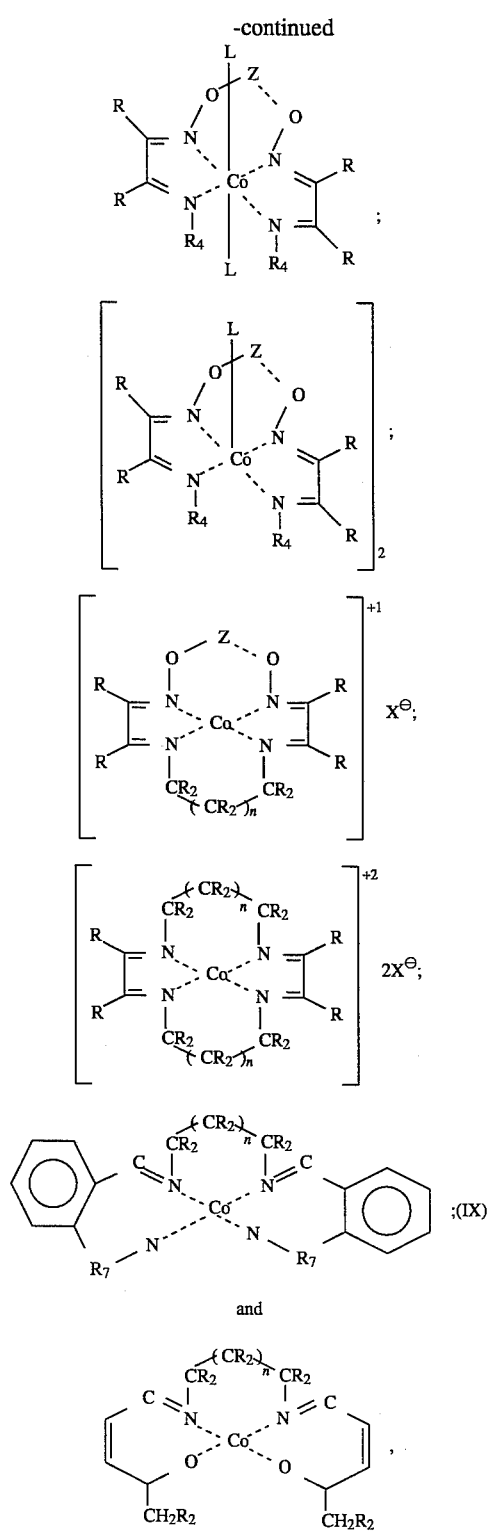

and wherein each R is independently selected from the group consisting of phenyl, $C_{1-20}$ alkyl wherein each α-carbon atom contains two hydrogen atoms, or R and R on adjacent carbon atoms, taken together, e.g., $C_{5-8}$ cycloalkylene, unsubstituted in the α-positions; $R_2$ is H or $C_xH_{2x+1}$ wherein x is an integer from 1 to 12; each $R_4$ is H or both $R_4$ groups taken together represent —O—Z—O—; $R_7$ is O or NH; n is 0 or 1; Z is H, $BF_2$, $BCl_2$, $BBr_2$ or $B(R_2)_2$; X is $NO_3$, Cl, Br, I, $BF_4$, $PF_6$, $SbF_6$ or $R_1COO$, wherein $R_1$ is $C_{1-2}$ alkyl; and L is $H_2O$ or $(C_6H_5)_3P$; provided however, each of either or both aromatic rings shown in formula (X) is optionally substituted with a benzo group, which optionally contains up to four substituents.

Additional examples, such as those used by Enikolopyan, identified previously, would include $Co^{2+}$-hematoporphyrin tetramethyl ether, $Co^{2+}$-meso-tetraphenylporphyrin, $Co^{2+}$-meso-porphyrin dimethyl ether, $Co^{2+}$-protophyrin dimethyl ether, and $Co^{2+}$-phthalocyanine.

EXAMPLES

The best mode for carrying out the invention will now be described for the purposes of illustrating the best mode known to the applicant at the time. The examples are illustrative only and not meant to limit the invention, as measured by the scope and spirit of the claims.

Experimental Procedures

All monomers used were purified by double distillation over $CaH_2$ prior to polymerization experiments. Alkyl cobaloximes were prepared according to procedures outlined by Schrauzer, *Acc. Chem. Res.*, 1, 97 (1968). Polymerizations were conducted under argon using either bulk monomer or 50–80% solutions of monomer in $CHCl_3$, at room temperature. Initiator/monomer ratios ranged from $1.25 \times 10^{-3}$ to $5 \times 10^{-3}$, and the polymerization mixtures were irradiated by a 500 Watt tungsten lamp. Control experiments indicated that polymerization did not occur under these conditions when the initiator was absent. Polymers were isolated by column chromatography using silica gel as adsorbent and chloroform as eluent.

Example #1

First Synthesis of Alkyl Cobaloxime Photoinitiator

A 100 ml four-necked flask containing a magnetic stirring bar was charged with 1.9034 g (8.0 millimoles) cobalt chloride hydrate and 1.858 g (1.6 millimoles) dimethyl glyoxime. The necks of the flask were then fitted with a butyl rubber septum (14/20), an argon inlet (19/22), an argon outlet (14/20) and a Tygon® tube fitted with 13/20 and 19/22 ground glass joints at both ends. The tube connected the four-necked flask with a 200 ml three-necked flask, containing 50 ml of water and 1 ml of pyridine. The other two necks of the 200 ml flask were fired with 19/22 butyl rubber septa.

After flushing the two flask system thoroughly with argon (~50 min), 40 ml of freshly distilled and degassed methanol were anaerobically injected by syringe, and the resulting mixture stirred for about 1 hr until no undissolved cobalt chloride remained (complete dissolution of dimethylglyoxime not being essential).

Subsequently 0.64 g (1.6 millimole) of NaOH was dissolved in 1.5 ml of water and 0.7 ml (9.0 millimole) of pyridine were anaerobically injected by syringe and the mixture was stirred for ~1 hr until the formation of the complex $[Co(DH)_2py]$ (DH=dimethylglyoxime ligand), was completed. 0.32 g (8 millimoles) of NaOH were dissolved in 1 ml of water and 0.3028 g (8 millimoles) of sodium borohydride in 1 ml of water were anaerobically injected. The color of the mixture changed immediately from dark brown to dark blue indicating the formation of the $Co(DH)_2py^{\ominus}$ complex.

After stirring for 20 minutes, 8.0 millimoles of the appropriate alkyl or aryl bromide (or 4.0 millimoles for a dicobaloxime complex) were added and the reaction mixture was stirred until completion of the reaction. The progress of the reaction was monitored by thin layer chromatography (TLC) and the time varied from 2 to 24 hours for the various alkyl bromides. The suspension was then poured, through the Tygon® tube to the three-necked flask where the alkyl cobaloxime precipitated as an orange-brown powder. The final product was filtered and washed with water and diethyl ether in order to remove the non-alkylated cobaloximes. The alkyl cobaloxime crystals were then dried at 40° C. at 1 mm pressure and stored under argon and minimum light conditions.

The above example is typical of but one way to synthesize the alkyl cobaloxime photoinitiator. It is well-known to those skilled in the art that different products will require different bases as well as different precipitation solvents and/or mixtures of solvents.

Example #2

Second Synthesis of Alkyl Cobaloxime Photoinitiator

In a single neck, 100 ml round-bottom flask, 1.993 g (8.0 millimoles) of cobalt acetate tetrahydrate and 1.858 g (16.0 millimoles) of dimethylglyoxime (DMG) were charged and the neck fined with a serum cap. After purging the flask thoroughly with argon, 35 ml of methanol were charged. The suspension was stirred until all DMG was dissolved (typically less than 1 hr). 8.0 millimoles of monomer (e.g., acrylonitrile, acrylic acid, ethyl acrylate) were added and the flask purged with hydrogen. The reaction time, which was monomer dependent, ranged from ~3–7 hours, and was followed by $^1$H-NMR. After completion, the suspension was poured into 80 ml of water containing 10 millimoles of pyridine and stirred for 0.5 hours. The orange-yellow precipitate was filtered and washed with water and ether and dried in a vacuum oven.

After the addition of the monomer, the reaction flask was protected from the light, and the final products kept in dark bottles under an inert atmosphere, preferably argon. Since alkyl cobaloximes with ethyl acrylate and acrylic acid show some solubility in water, extensive aqueous washing should be avoided.

The following tables illustrate the variety of cobaloximes which can be prepared, through $Co^{+1}$ and through cobalt hydride respectfully.

TABLE I

Alkyl Cobaloximes Synthesized through $Co^{+1}$

| Alkyl Cobaloxime | Base | Name (yield) |
| --- | --- | --- |
| Ph-CH$_2$-Co | Pyridine | Benzyl pyridinato cobaloxime (92%) |
| O$_2$N-Ph-CH$_2$-Co | Pyridine | 4-Nitrobenzyl pyridinato cobaloxime (90%) |
| Co-CH$_2$-Ph-CH$_2$-Co | Pyridine | 1,4-Xylylene di(pyridinato cobaloxime) (73%) |
| Co-CH$_2$-(CH$_2$)$_4$-CH$_2$-Co | Pyridine | 1,6-Hexyl di(pyridinato cobaloxime) (65%) |
| Cl-CH$_2$-(CH$_2$)$_4$-CH$_2$-Co | Pyridine | 6-Chloro-1-hexyl pyridinato cobaloxime (67%) |
| CH$_3$-CH$_2$-CH(OH)-CH$_2$-Co | Pyridine | 2-Hydroxy-1-butyl pyridinato cobaloxime (89%) |
| (H$_3$C)$_2$CH-Co | Pyridine | Isopropyl pyridinato cobaloxime (93%) |
| (H$_3$C)$_2$CH-Co | Triphenyl phosphine | Isopropyl triphenyl-phosphinato cobaloxime (89%) |

TABLE II

Alkyl Cobaloximes Synthesized through Cobalt Hydride

| Alkyl Cobaloxime | Base | Name (yield) |
| --- | --- | --- |
| CH$_3$-CH(C(=O)OH)-Co | Pyridine | 1-Carboxymethyl pyridinato cobaloxime (54%) |
| CH$_3$-CH(C(=O)OC$_2$H$_5$)-Co | Pyridine | 1-Carboxethoxyethyl pyridinato cobaloxime (59%) |
| CH$_3$-CH(CN)-Co | Pyridine | 1-Cyanoethyl pyridinato cobaloxime (76%) |

Example #3

Cobaloxime Photoinitiated Polymerization of Acrylate Esters

The alkyl cobaloximes synthesized by the procedures described in Example #1 and Example #2, as shown in Tables I and II, were then used as initiators for free radical polymerization of acrylate esters (e.g., butyl, ethyl, and methyl) due to the photolability of the cobalt-carbon bond.

A specified amount of initiator (typically 0.1895 g (0.46 millimoles of isopropyl cobaloxime) was charged to a 100 ml single-neck flask containing a magnetic stirring bar. The neck was fitted with a $^{14}\!/_{20}$ rubber septum. After flushing the flask thoroughly with argon (by means of needles as inlet and outlets), a specified volume of degassed chloroform (typically 5 ml) was anaerobically injected by syringe followed by anaerobic injection of a specified volume of acrylate ester, (typically ethyl acrylate (20 ml, 0.1846 moles)).

The clear orange solution was stirred and irradiated under argon with a 500 Watt tungsten lamp at 15 cm from the flask. Periodically, duplicate samples of the reaction mixture were removed by syringe, one for analysis of percent conversion and the other for analysis of molecular weight.

Figure 8:
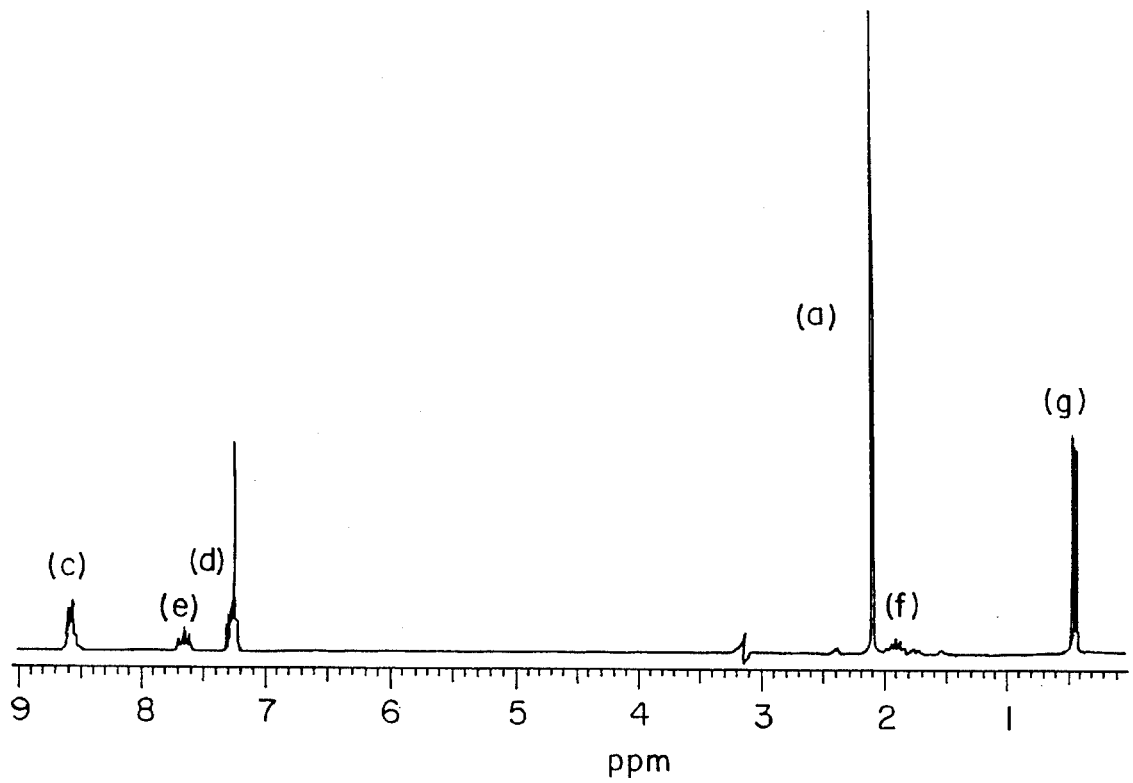
FIG. 8 is a $^1$H-NMR spectrum of isopropyl (pyridinato) cobaloxime.

The extent of conversion was determined by $^1$H-NMR analysis, by comparing the integral of the signal corresponding to the vinyl hydrogen of the monomer, to that corresponding to the ethyl or methyl hydrogen of the side chain of both monomer and polymer. All $^1$H-NMR spectra were obtained using a Varian Gemini 200 MHz instrument at room temperature using deuterated chloroform as the solvent. The $^1$H-NMR spectra of isopropyl (pyridinato) cobaloxime is shown in FIG. 8.

All Gel Permeation Chromatographs (GPC) were obtained using a Waters Model 150-C instrument with a differential refractometer detector at 30° C. In all cases, a poly(methyl methacrylate) calibration curve was used. The polymerizations were run at 0.5, 0.25 and 0.125 mole percent initiator (initiator/monomer) and at 100, 80, 67, and 50 percent monomer by volume.

Example #4

Isopropyl Pyridinato Cobaloxime Photoinitiated Polymerization

Isopropyl pyridinato cobaloxime, wherein R=(CH$_3$)$_2$CH—, and B=C$_5$H$_5$N), was used to initiate free radical polymerization of ethyl acrylate in chloroform solution under light irradiation conditions. After the complete consumption of the monomer, the addition of a second batch of monomer exhibited the same behavior under continuous light irradiation. A third monomer addition resulted also in quantitative consumption indicating that the chain end remained active for further reaction. Monomer conversion was followed by $^1$H-NMR spectroscopy, the time dependence for the conversion of ethyl acrylate being illustrated in FIG. 1 and the reaction schematic being shown in Schematic 1.

Figure 2:
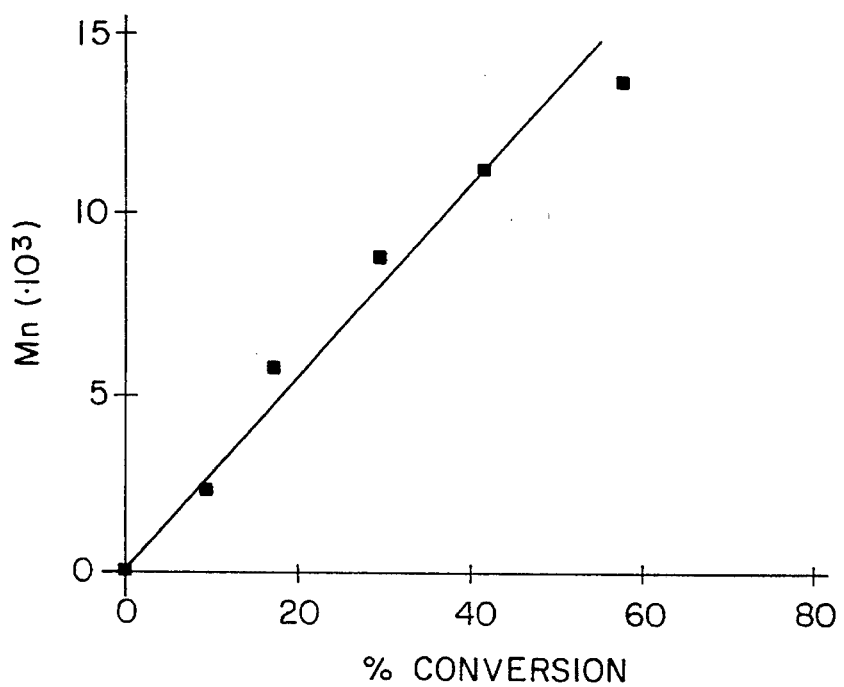
FIG. 2 is a plot of molecular weight vs. percent conversion for isopropyl cobaloxime initiated polymerization of an 80% solution of ethyl acrylate in $CHCl_3$, wherein $[I]=18.4\times 10^{-3}M$.

The molecular weights, as measured by size exclusion chromatography, (or gel permeation chromatography), increased linearly with conversion as shown in FIG. 2.

While not wishing to be bound by theory, the mechanism of the polymerization seems to involve photolytic cleavage of the cobalt-carbon bond, insertion of the monomer units and rapid recombination in a repetitive process. Catalytic chain transfer competes with propagation significantly only at low monomer concentrations, wherein the percent conversion exceeds at least 85%.

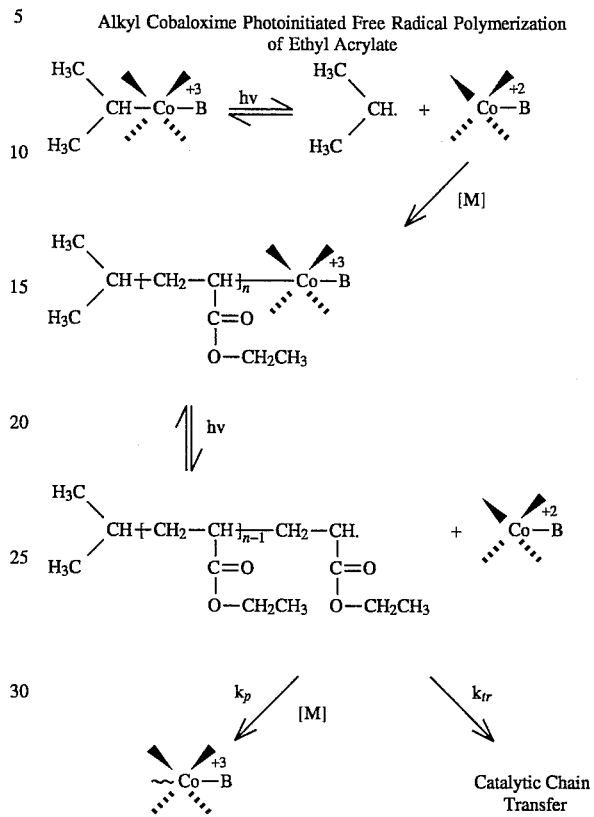

Scheme 1

Alkyl Cobaloxime Photoinitiated Free Radical Polymerization of Ethyl Acrylate

Experimental evidence that supports the proposed mechanism includes the following experimental observations: (a) the absence of a Trommsdorff effect in bulk polymerizations; (b) the cobalt catalyst could not be removed from the polymer by any type of column chromatography although a mixture of terminated polymer and cobaloxime was easily separated; (c) block copolymers were prepared by sequential monomer addition; (d) propagation stopped when the light source was turned off, the "dormant" polymer chains were stable in the dark for long periods of time and could be reactivated for further monomer addition by exposure to light; (e) $^1$H-NMR characterization of the polymer showed progressively increasing amounts of unsaturated chain ends due presumably to chain transfer as monomer concentration was decreased; and (f) the fact that β-carboethoxy ethyl cobaloxime, which resembles the polymer chain end, was stable and could initiate polymerization under light irradiation.

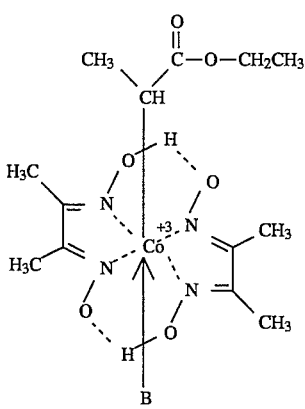

β-carboethoxy ethyl cobaloxime

Therefore, what is shown is the use of a cobaloxime photoinitiator which reversibly participates in the polymerization reaction, alternating between a $Co^{+2}$ oxidation state and a $Co^{+3}$ oxidation state when attached to the chain end. What is essential is that the Co be coordinatively attached to ligands, such as that shown by generic formula (XI)

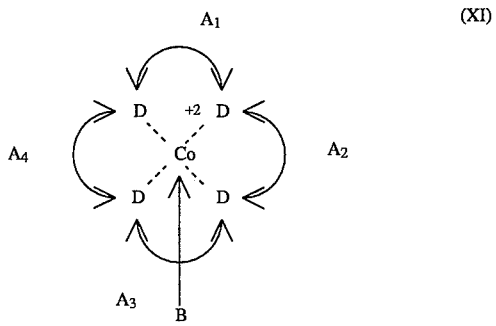

wherein $A_{1-4}$ and B represent coordinating ligands with cobalt, and D represents the coordinating atom of the ligand and is selected from the group consisting of oxygen and nitrogen, wherein the ligands are arranged in such a configuration that there is at least one coordinative open site wherein a growing polymer chain (P) can also coordinatively attach, such as that shown by genetic formula (XII).

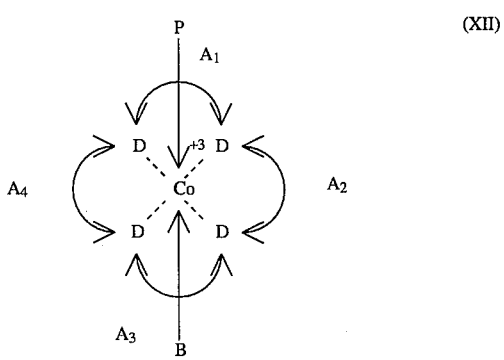

The ligands $A_{1-4}$ in preferred embodiment, will lie in an essentially planar conformation within the equatorial plane surrounding the cobalt.

The choice of the solvent is important. When a poorer solvent than chloroform, such as benzene was used, extensive chain transfer along with side reactions, (Schematic 2), were observed. Further, the system was heterogeneous and poorly controlled, indicating that solvation effects should be important in this type of system.

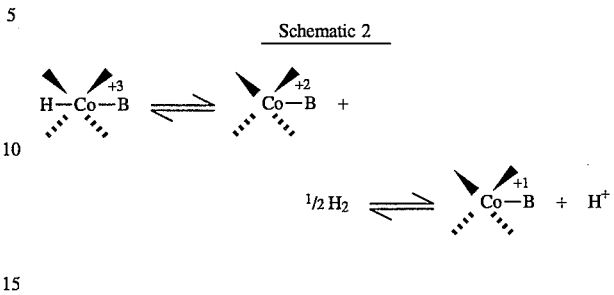

Schematic 2

Example #5

Synthesis of Benzyl Cobaloximes

Benzyl cobaloxime was synthesized by generating cobaloxime in benzene solution (with pyridine as the axial ligand), and subsequently alkylating the resulting cobaloxime with benzyl bromide according to the procedure described by Schneider, Phelan and Halpern, *J. Am. Chem. Soc.*, 91, 77 (1969). Due to the sensitivity of the benzyl cobaloxime product to air and light, the alkylation was carried out under an inert atmosphere in a flask that was shielded from light.

Example #6

Polymerization of Methyl and Ethyl Acrylate

Benzyl cobaloxime photoinitiated polymerizations of methyl acrylate and ethyl acrylate were conducted by first synthesizing benzyl cobaloxime (in-situ) in benzene, removing bromocobaloxime and water, and finally injecting monomer and exposing the reaction mixture to high intensity visible light. Removal of the insoluble bromocobaloxime by filtration was necessary due to the fact that it interferes with the transmission of light through the reactor, thus limiting the amount of light available to the benzyl cobaloxime photoinitiator. In order to achieve conversions, the removal of water from the system was of primary importance due to the competing photochemical reaction known as photoaquation.

Figure 3:
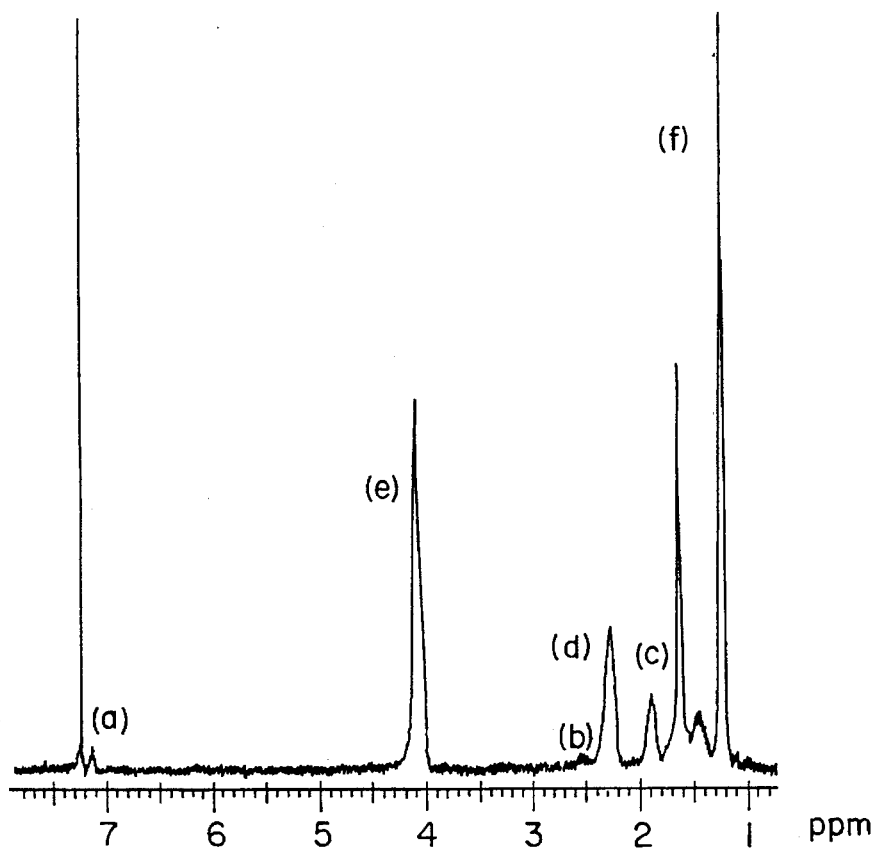
FIG. 3 is a $^1$H-NMR spectrum of cobaloxime terminated poly(ethyl acrylate) obtained by benzyl cobaloxime photoinitiated polymerization.
Figure 7:
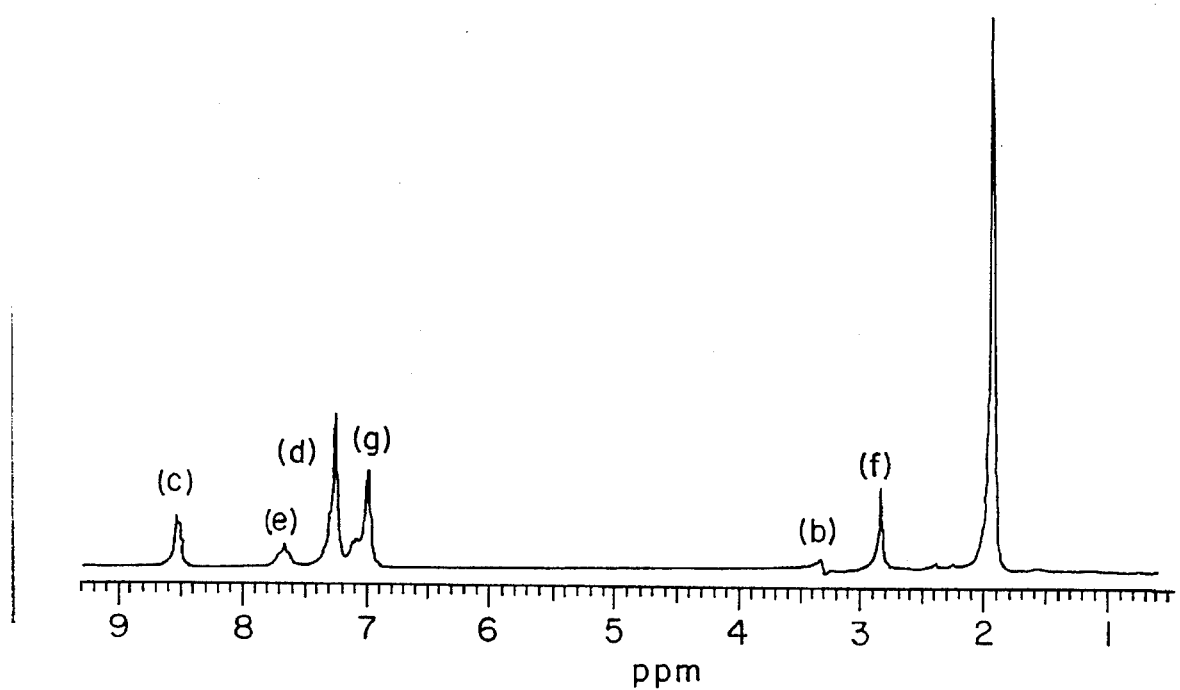
FIG. 7 is a $^1$H-NMR spectrum of benzyl (pyridinato) cobaloxime.

The course of the polymerization was monitored by periodically removing samples, which were characterized using $^1$H-NMR. The $^1$H-NMR spectrum of a low molecular weight benzyl cobaloxime photoinitiated poly(ethyl acrylate) along with peak assignments are given in FIG. 3 while the $^1$H-NMR spectrum of benzyl (pyridinato) cobaloxime is shown in FIG. 7 for comparison.

Figure 4:
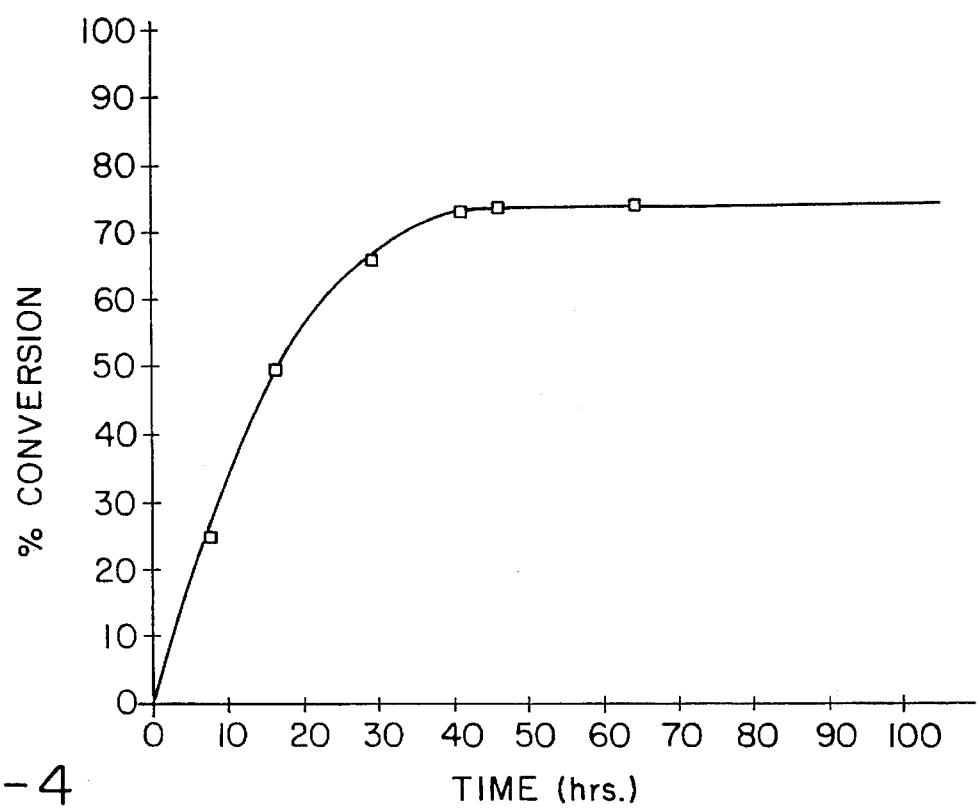
FIG. 4 is a plot of conversion vs. time for the benzyl cobaloxime photoinitiated polymerization of methyl acrylate in bulk.

FIG. 4 shows a plot of conversion vs. time for the above polymerization system. As is seen in the Figure, the observed rate of conversion decreases as a function of time. As monomer concentration in solution decreases as a result of conversion to polymer, the growing chain end has access to fewer monomer molecules upon each successive photolysis event, before recombination of the chain end occurs, resulting in the observed decrease in rate. This behavior was observed in benzyl cobaloxime photoinitiated acrylate polymerizations conducted over values of initial monomer concentration ranging from bulk monomer shown in FIG. 4, to 20% monomer by volume.

Figure 5:
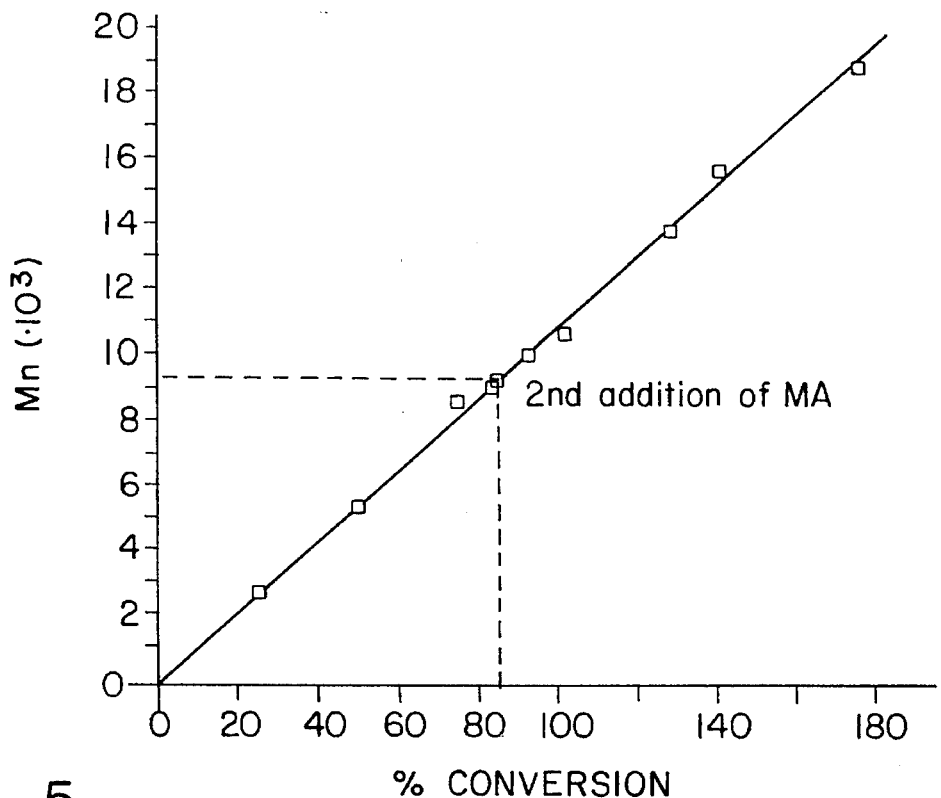
FIG. 5 is a plot of the molecular weight ($M_n$) vs. percent conversion for benzyl cobaloxime photoinitiated polymerization of methyl acrylate in benzene.

FIG. 5 shows a plot of molecular weight of the polymer vs. conversion data resulting from the benzyl cobaloxime photoinitiated polymerization of methyl acrylate, based on data collected and shown in Table III.

TABLE III

Molecular Weight vs. Conversion (Benzene solvent)

| Percent Conversion | Molecular Weight ($M_n$) |
|---|---|
| 25.28 | 2,750 |
| 50.19 | 5,460 |
| 74.66 | 8,670 |
| 83.53 | 9,070 |
| →84.61 | 9,330 |
| 92.88 | 10,070 |
| 101.82 | 10,800 |
| 128.41 | 13,850 |
| 140.63 | 15,720 |
| 176.28 | 18,960 |

The table includes data collected until the conversion reached a plateau, at which time a second addition of monomer was made, and data collected after the second monomer addition. The conversion data are evaluated in terms of the initial monomer charge and the arrow indicates the point at which the second addition of monomer was made. This also indicates the importance of the solvent effect, wherein a plateau at around 80% was not observed when the polymerization was effected in chloroform, rather than benzene.

In benzene, a gradual halt in conversion is observed due to the fact that there is a threshold concentration of monomer in solution at which recombination of the chain end occurs without the insertion of additional monomer units, and thus is not a result of the destruction of active chain ends. This is best demonstrated by examining conversion vs. time data that include points collected after the polymerization has reached a conversion plateau, and a subsequent second addition of monomer has been made.

The conversion vs. time data obtained, as described above, from a benzyl cobaloxime photoinitiated polymerization of methyl acrylate are given in Table IV.

TABLE IV

Conversion vs. Time (Benzene solvent)

| Time (hrs.) | Conv. (%) |
|---|---|
| 10 | 25.28 |
| 20 | 50.19 |
| 45 | 74.66 |
| 64 | 83.53 |
| 70 | 85.30 |
| →89 | 84.61 |
| 108 | 48.27 |
| 113 | 57.21 |
| 122 | 73.80 |
| 138 | 86.02 |
| 162 | 91.67 |
| 188 | 94.37 |
| 211 | 95.21 |

The conversion data, in this instance, are evaluated in terms of the total amount of monomer that has been added at the time of the measurement. Once again, the arrow indicates the point at which the second addition of monomer was made.

Figure 6:
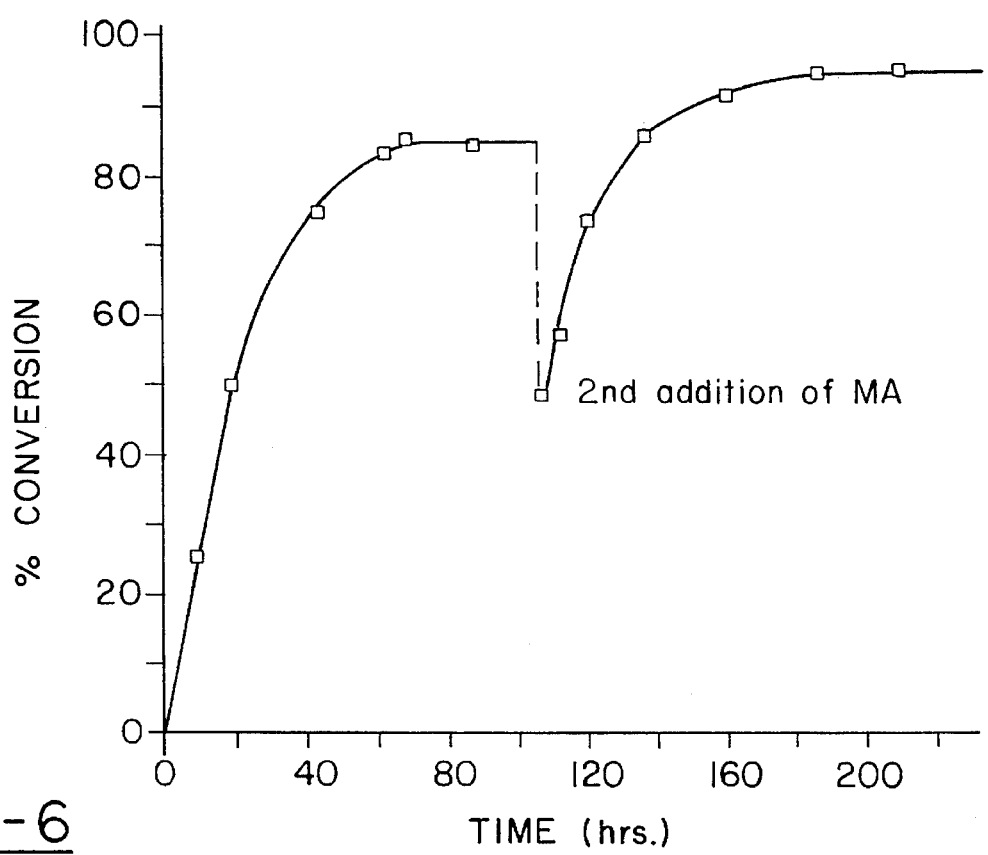
FIG. 6 is a plot of conversion vs. time for the benzyl cobaloxime photoinitiated polymerization of methyl acrylate in benzene.

A plot of the conversion vs. time is shown in FIG. 6. This plot clearly shows that after the polymerization has reached a conversion plateau and a second addition of monomer has been made, conversion begins once again and continues until a second plateau is reached.

Example #7

Synthesis of End-Functionalized Polymers

End-functionalized polymers were synthesized by anaerobically injecting 30 ml of degassed chloroform, (containing an excess, typically two-fold according to the initial moles of initiator), of diphenyl sulfide, which may or may not be substituted, (typically 0.2 g of phenyl disulfide, 0.92 millimoles for 0.1895 g of isopropyl cobaloxime (0.46 millimoles), to any one of the synthesized polymers prepared above, (e.g., polyethyl acrylate, prepared by 0.1895 g of isopropyl cobaloxime, 5 ml chloroform, and 20 ml of ethyl acrylate). The mixture was irradiated with a 500 Watt tungsten lamp at 15 cm from the flask for 6 hours. The resulting polymer was purified using column chromatography (basic alumina or silica gel) with chloroform as an eluent.

Figure 11:
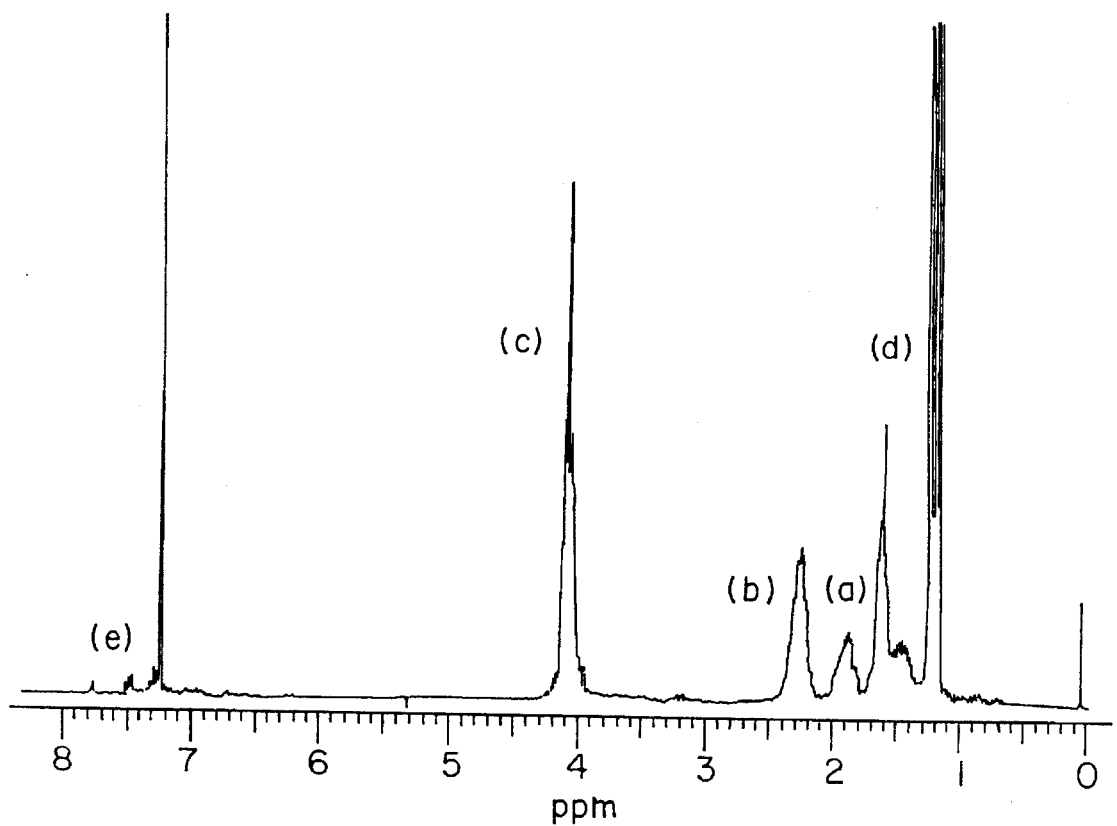
FIG. 11 is a $^1$H-NMR spectrum of poly(ethyl acrylate) terminated with phenylsulfide.

The general reaction is shown in Schematic 3 and the $^1$H-NMR spectrum of poly(ethyl acrylate) terminated with phenylsulfide is provided as FIG. 11.

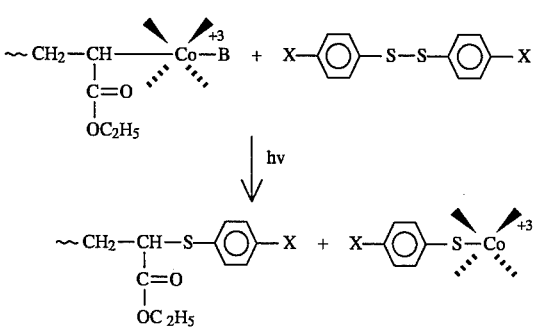

Schematic 3

Example #8

DiBlock and TriBlock Copolymer Synthesis

Block copolymers of acrylate esters were synthesized by the sequential monomer addition technique as shown in Schematic 4. Specifically, poly(ethyl acrylate) was prepared by the above mentioned procedures (i.e., 0.1895 g of isopropyl cobaloxime, 5 ml chloroform, and 20 ml of ethyl acrylate). After complete consumption of the first monomer, butyl acrylate (20 ml, 0.1395 moles) was anaerobically injected into the flask and the mixture was irradiated under conditions similar to those used for the polymerization of the first monomer.

Figure 9:
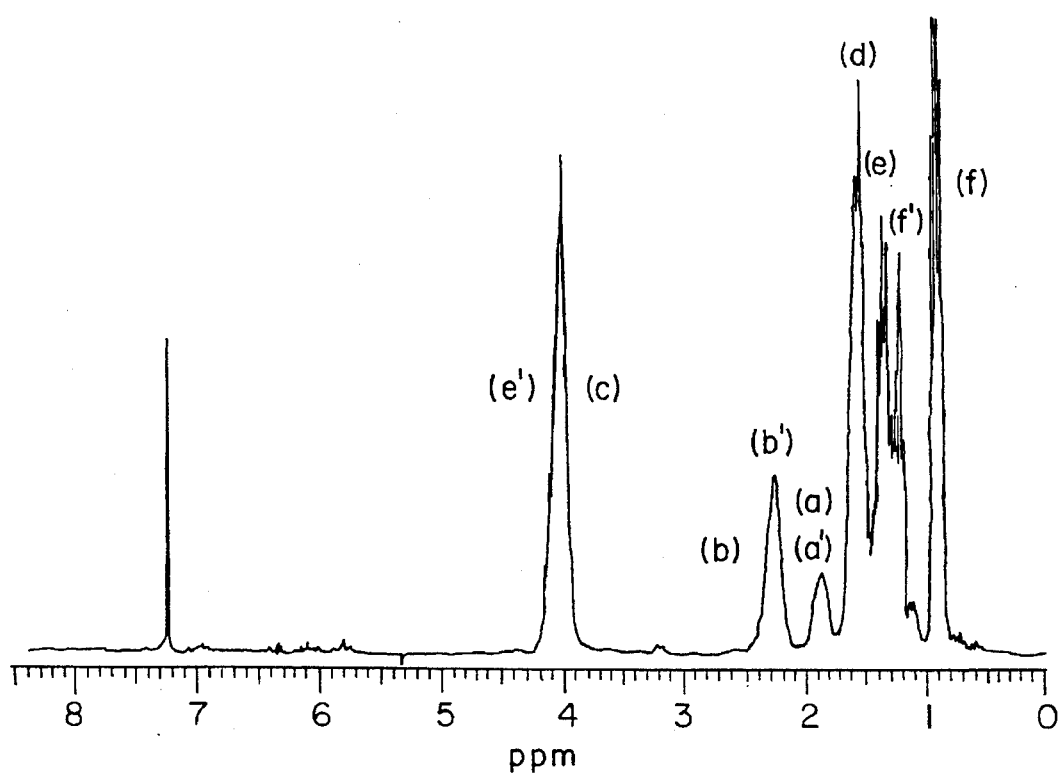
FIG. 9 is a $^1$H-NMR spectrum of a poly(ethyl-co-butyl) acrylate.

The appearance of the peaks attributed to the poly(butyl acrylate) block in the $^1$H-NMR spectrum (FIG. 9), as well as the increase in the molecular weight, as detected by GPC, support the formation of the poly(ethyl acrylate-co-butyl acrylate) block copolymer.

Figure 10:
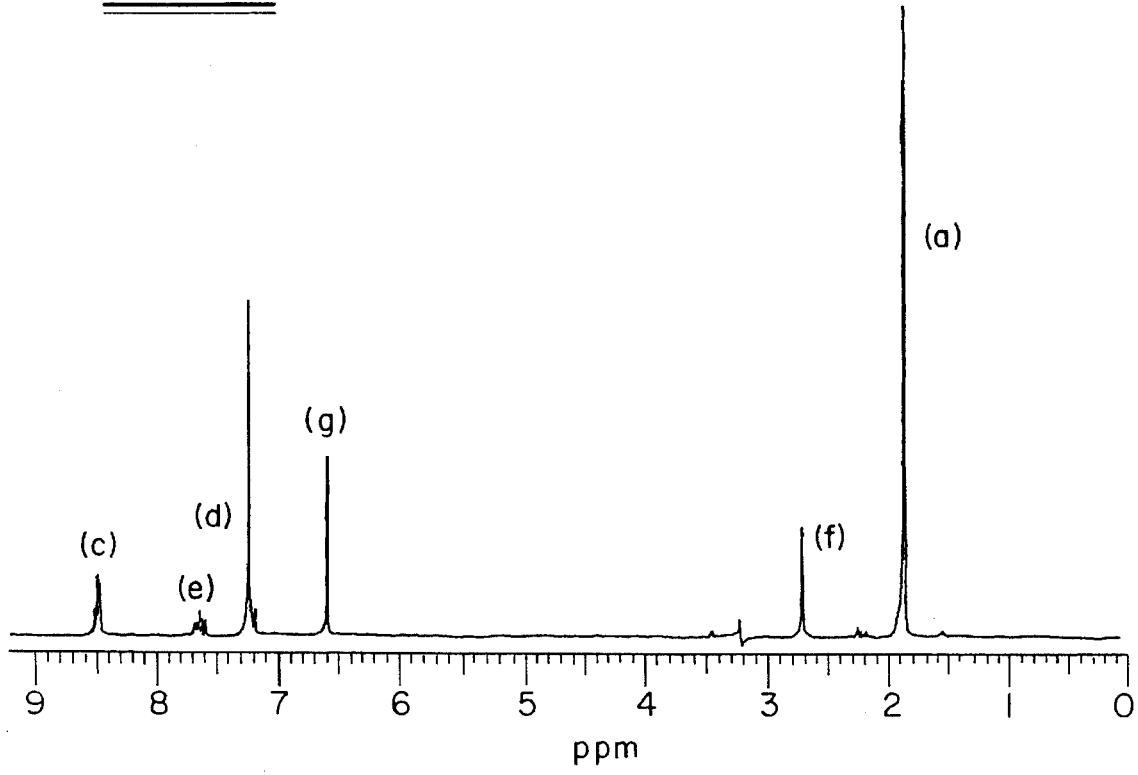
FIG. 10 is a $^1$H-NMR spectrum of 1,4-xylylene di(pyridinato) cobaloxime.

Schematic 4
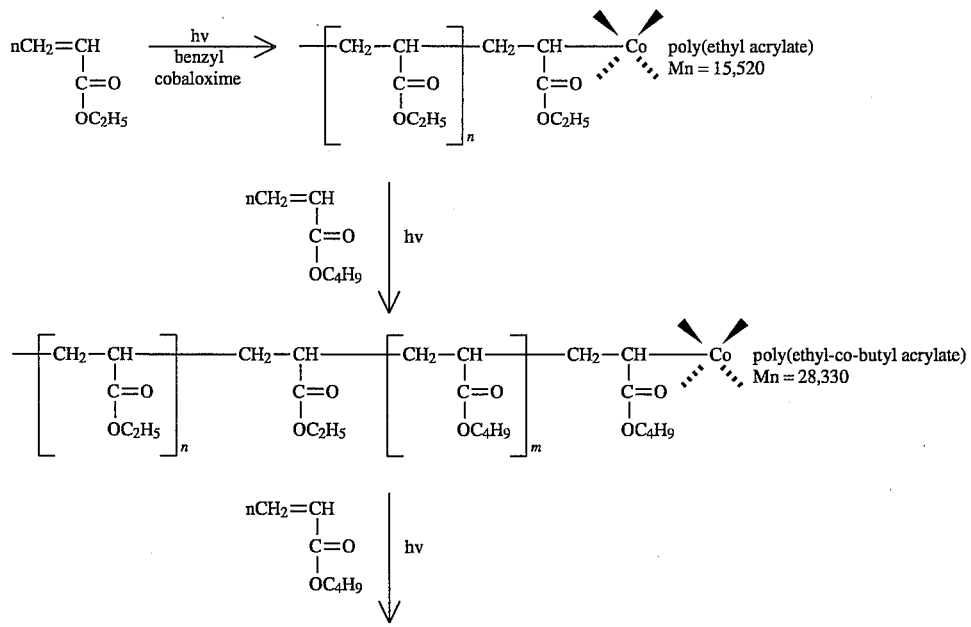
In a completely analogous manner, triblock copolymers can be synthesized in a two step process using difunctional initiators such as 1,6-hexyl[di(pyridinato) cobaloxime] shown below, the $^1$H-NMR spectra of which is shown in FIG. 10.
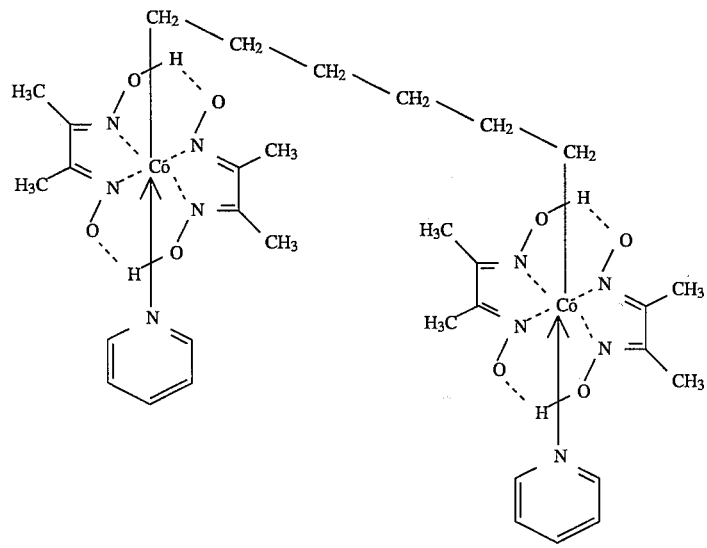
or by the use of 1,4-xylylene di(pyridinato) cobaloxime

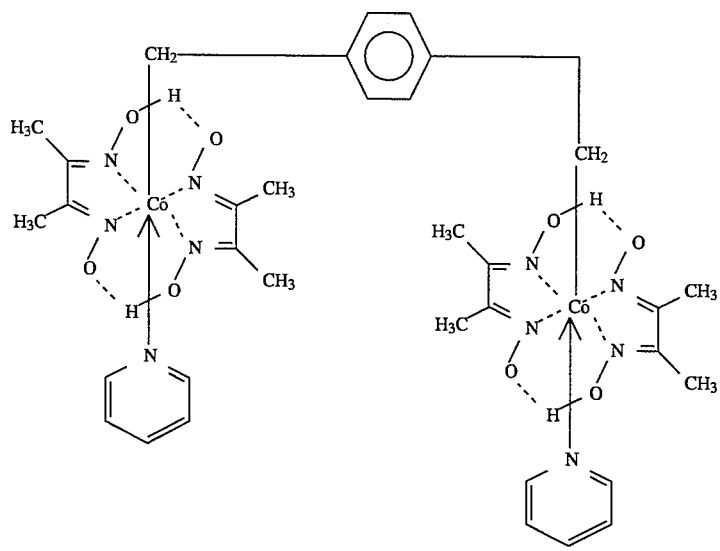

While the above invention has been described generally for acrylate monomers, there is no need to limit the invention to such. Other suitable polymerizable acrylates would include acrylic acid, acrylic anhydride, methyl acrylate, ethyl acrylate, propyl acrylate, t-butyl acrylate, cyclopentyl acrylate, cyclohexyl acrylate, 2-ethylhexyl acrylate, octyl acrylate, benzyl acrylate, hydroxyethyl acrylate, phenylethyl acrylate, dimethylaminoethyl acrylate, glycidyl acrylate, 2-chloroethyl acrylate, trifluoroethyl acrylate, pentafluorobenzyl acrylate, phenyl arylate, naphthyl acrylate, biphenyl acrylate, t-butylphenyl acrylate, p-chlorophenyl acrylate, 2,4,6-tribromophenyl acrylate, vinyl triazole, butoxyethyl acrylate, ethoxyethyl acrylate, tributyltin acrylate, hexamethyldisiloxypropyl acrylate, heptafluorobutyl acrylate, 3-acryloxypropyltrimethoxysilane, N-acryloxyethyl succinimide, and N-acryloxyethyl phthalimide.

Suitable acrylamides and their derivatives would include acrylamide, N,N'-dimethylacrylamide, acryloyl morpholine, and N,N'-bis(hydroxyethyl)acrylamide.

Suitable ethylene-based and substituted ethylene-based polymers would include ethylene, vinyl chloride, vinyl bromide, vinylidene chloride, chlorotrifluoroethylene, vinyl acetate, vinyl propionate, vinyl benzoate, vinyl trifluoroacetate, vinyl perfluorooctanoate, acrylonitrile, vinyl phenyl sulfone, phenyl vinyl ketone, methyl vinyl ketone, dimethyl vinylphosphonate, N-vinylpyrrolidone, N-vinylphthalimide, t-butyl vinyl carbonate, and N-t-butyl vinyl carbamate.

Suitable dienes would include, butadiene, chloroprene, and 2-phenylbutadiene.

Appropriate styrenic-type monomers would include styrene, o-halostyrene, m-halostyrene, p-halostyrene wherein the halo would include fluorine, chlorine and bromine, chlorofluorostyrenes, pentafluorostyrenes, vinyl benzyl alcohol, 4-vinyl benzoic acid, p-dodecylstyrene, vinylpyridine, and vinylquinoline.

Among the disubstituted monomers would be included maleic anhydride, maleimide, N-methylmaleimide, N-phenylmaleimide, diethyl fumarate, and diphenyl fumarate.

It is also envisioned within the scope of this invention to use copolymers, terpolymers, etc. from combination of the above monomers and still be within the teachings of this invention. One such example might be copolymers of vinyl ethers with maleic anhydride, and fumarate esters.

Additionally, the same chemistry can also be applied using other cobalt compounds that can form stable organo-cobalt complexes which under photolytic cleavage of the carbon-cobalt bond.

The free radical polymerization systems described herein propagate by means of reversible termination, and exhibit some of the characteristics of living polymerizations. These systems, are designated as "pseudo-living" polymerizations, and make use of a class of compounds known as "iniferters" that initiate and reversibly terminate polymerization, in addition to acting as chain transfer agents. This special case of living polymerization is characterized by the presence of an equilibrium between a small concentration of active chain ends and a large concentration of reversibly terminated chains. Dithiocarbamates and their dimers, as represented by tetraethyldithiuram disulfide are an important class of photochemical iniferters which react in this manner as do the cobaloximes of this invention.

Discussion

From the above discussion, it can be seen that what is taught is the ability to synthesize polymers and copolymers that can be used to further initiate polymerization in a "pseudo living" manner, by reaction with monomers in the presence of light. By selection of the appropriate cobaloximes and related cobalt(II) complexes which have essentially planar equatorially coordinated ligands and a pair of axially coordinated ligands which have at least one carbon-cobalt bond, it is possible to prepare polymers which have useful terminal functionality. The process also teaches the photochemical polymerization and copolymerizations whereby the alkyl cobaloximes and related compounds, which are used as the photoinitiators, have alkyl groups, which may in essence, be polymers with carbon-cobalt chain ends, thereby allowing grafting reactions to occur to the polymer backbone.

While it is possible to synthesize the cobaloxime and related cobalt(II) complexes which have essentially planar equatorially coordinated ligands and a pair of axially coordinated ligands which have at least one carbon-cobalt bond initially, for subsequent addition to a monomer, it is also taught within this invention that the cobaloxime can be prepared "in-situ", such as by the routes which include: (1) Cobalt-hydride plus monomer addition; (2) free radical initiator plus monomer plus cobalt complex, the ratio of free radical initiator to cobalt complex being essentially 1:1; and (3) the reaction of Co(II) with an alkyl halide.

The ability to form block copolymers, which include triblocks and multiblocks using polymers which have terminal cobalt-carbon bonds in the presence of light is also shown. In a special variation, the blocks can be random copolymers.

Depending upon the cobaloxime and related cobalt(II) complexes which have essentially planar equatorially coordinated ligands and a pair of axially coordinated ligands which have at least one carbon-cobalt bond initiator employed, particularly those with multiple carbon-cobalt bonds, it is possible to synthesize multiple polymer segments, such as diblock copolymers, triblock copolymers, polymers with star structures, radial block copolymers, and graft copolymers, such as may be possible using pentaerythritol esters, or trimethylol propane.

The chemistry taught additionally permits the ability to functionalize both the head and the tail of the polymer. To functionalize the tail of the polymer, the alkyl-cobalt bond could be reacted with diaryl sulfides, or with other similar materials, with or without light, to replace the cobalt moieties with other useful functionalities, or to simply remove the cobalt. Similarly, depending upon the molecular structure of the cobalt photoinitiator, it is possible to impart significant functionality to the head component of the polymer.

Thus, what is demonstrated in the disclosure is a free radical polymerization process which comprises the step of photolyzing a cobalt complex which has essentially planar equatorially coordinated ligands and a pair of axially coordinated ligands which have at least one carbon-cobalt bond, wherein the cobalt complex is of formula (XIII)

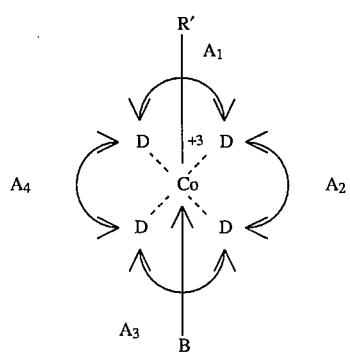

(XIII)

wherein $A_{1-4}$ are equatorial coordinating ligands with the cobalt, B is a coordinating base ligand which does not destroy the essentially planar conformation of the equatorial ligands, D represents a coordinating atom of the ligand and is selected from the group consisting of oxygen and nitrogen, and R' is a head group which attaches to the cobalt by a carbon-cobalt bond in the equatorial axis of the cobalt complex, the carbon-cobalt bond of which is selectively photolyzed to permit the insertion of a free radically polymerizable monomer thereinto, thereby forming a polymeric chain of repeating monomeric units which is terminated with a cobalt-carbon bond as shown in formula (XIV)

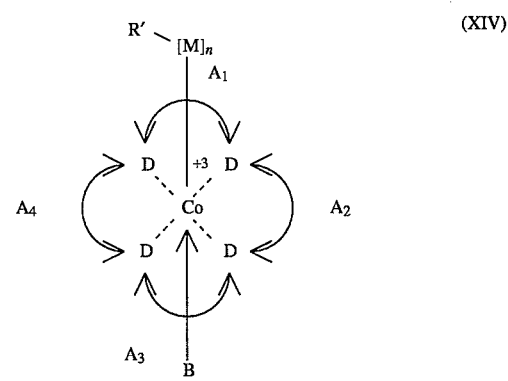

(XIV)

wherein M is the free radically polymerizable monomer and n is an integer indicating the number of repeat units of the monomer in the polymer chain, the cobalt atom in the complex being capable of alternating between $Co^{+2}$ and $Co^{+}$ in response to the photolytic cleavage of the carbon-cobalt bond, the cobalt complex remaining attached to the last monomeric unit through the terminal carbon-cobalt bond after the initial concentration of monomer has been polymerized.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A free radical polymerization process which comprises the step of photolyzing a cobalt(III) complex in a partially polar solvent having a bulk solvent donor number of at least 4.4 wherein the cobalt complex is of formula (XIII)

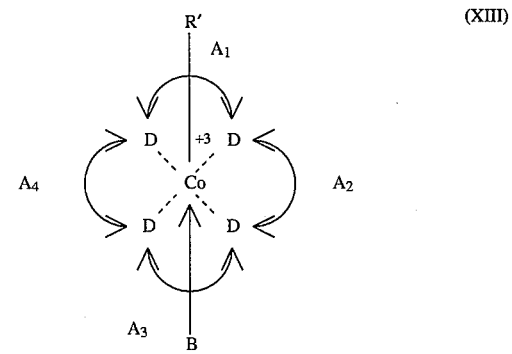

(XIII)

having essentially planar equatorially coordinated ligands and a pair of axially coordinated ligands which have at least one carbon-cobalt bond, and inserting at least one free radically polymerizable monomer into the photolyzed carbon-cobalt bond, thereby forming a polymeric chain of repeating monomeric units which is terminated with a cobalt-carbon bond as shown in formula (XIV)

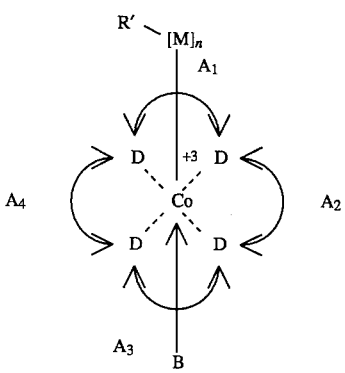

(XIV)

wherein $A_{1-4}$ are equatorial coordinating ligands with the cobalt,

B is a coordinating base ligand which does not destroy the essentially planar conformation of the equatorial ligands, D is a coordinating atom of the ligand and is selected from the group consisting of oxygen and nitrogen, R' is a head group which is initially attached to the cobalt by a carbon-cobalt bond in the equatorial axis of the cobalt complex, but which becomes attached to an end of the at least one inserting monomer after the insertion of the monomer, M is the free radically polymerizable monomer, and n is an integer indicating the number of repeat units of the monomer in the polymer chain, the cobalt atom in the complex being capable of alternating between $Co^{+2}$ and $Co^{+}$ in response to the photolytic cleavage of the carbon-cobalt bond, the cobalt complex remaining attached to the last monomeric unit through the terminal carbon-cobalt bond after the initial concentration of monomer has been polymerized.

2. The process of claim 1 wherein R' contains at least one functional group selected from the group consisting of halogen, cyano, nitro, carboxyl and hydroxyl.

3. The process of claim 1 wherein a terminal carbon-cobalt bond is further reacted with a diaryl disulfide.

4. The process of claim 1 wherein the at least one free radically polymerizable monomer further comprises two or more different monomers which result in a copolymer.

5. The process of claim 4 wherein the terminal carbon-cobalt bond is further reacted with a diaryl disulfide.

6. The process of claim 1 wherein the at least one free radically polymerizable monomer further comprises at least one second different monomer which is sequentially added after the completion of the polymerization of the first monomer, thereby resulting in a block copolymer.

7. The process of claim 6 wherein the terminal carbon-cobalt bond is further reacted with a diaryl disulfide.

8. The process of claim 1 wherein the cobalt complex has at least two photolyzable cobalt-carbon bonds.

9. The process of claim 8 wherein the cobalt complex has at least three photolyzable cobalt-carbon bonds, which when reacted with at least one free radically polymerizable monomer results in a radial polymer.

10. The process of claim 9 wherein the terminal carbon-cobalt bond is further reacted with a diaryl disulfide.

11. The process of claim 9 wherein the cobalt complex is sequentially reacted with at least two different free radically polymerizable monomers the second monomer being added after the completion of the polymerization of the first monomer, resulting in a radial block copolymer.

12. The process of claim 11 wherein the terminal carbon-cobalt bond is further reacted with a diaryl disulfide.

13. The process of claim 1 wherein the cobalt complex is synthesized and used "in-situ" for the free radical polymerization.

14. The process of claim 1 wherein the cobalt complex is added to a polymer.

15. The process of claim 1 wherein R' is a polymer which contains at least one cobalt complex of formula (XIII).

16. The process of claim 15 wherein the cobalt complex is further reacted with at least one additional different free radically polymerizable monomer after the completion of the polymerization of the first monomer, resulting in a graft copolymer.

17. The process of claim 16 wherein the terminal carbon-cobalt bond is further reacted with a diaryl disulfide.

18. The product of the process of claim 1.
19. The product of the process of claim 3.
20. The product of the process of claim 4.
21. The product of the process of claim 6.
22. The product of the process of claim 9.
23. The product of the process of claim 11.
24. The product of the process of claim 16.

* * * * *